C. S. EATON.

RIVET.

APPLICATION FILED MAR. 20, 1917.

Reissued Aug. 27, 1918. 14,513.

Harold Brocheron

C. S. Eaton INVENTOR

BY Cornelius C. Billings

ATTORNEY

THE NORRIS PETERS CO., PHOTO-LITHO., WASHINGTON, D. C.

UNITED STATES PATENT OFFICE.

CLARA S. EATON, OF NEW YORK, N. Y.

RIVET.

14,513. Specification of Reissued Letters Patent. Reissued Aug. 27, 1918.

Original No. 1,120,378, dated December 8, 1914, Serial No. 818,189, filed February 12, 1914. Application for reissue filed March 20, 1917. Serial No. 156,189.

*To all whom it may concern:*

Be it known that I, CLARA S. EATON, a citizen of the United States, and a resident of the borough of Manhattan, city, county, and State of New York, have invented certain new and useful Improvements in Rivets, of which the following is a specification.

This invention relates to rivets and especially to two pronged rivets adapted to secure the plates of a belt fastener to a belt.

One of the objects of the invention is to provide a rivet of such construction that it can be used only with a plate especially adapted for said rivet; *i.e.*, to provide a rivet that can be inserted in a certain position only in a plate having a corresponding hole, as in the patent to Eaton No. 881,389, granted March 10, 1908.

Other objects will appear from the hereinafter description.

The novel features of the invention will be understood from the description taken in connection with the accompanying drawing in which the same reference character indicates the same part in the several views.

Referring to the drawing.

Figure 1:
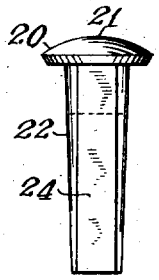
Figure 1 is a side elevation on an enlarged scale of one embodiment of the invention.
Figure 2:
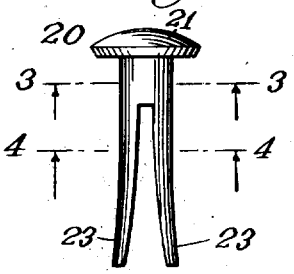
Fig. 2 is another view at right angles to Fig. 1.
Figure 3:
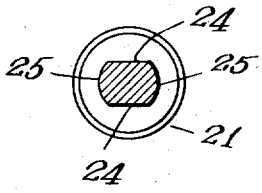
Fig. 3 is a section on line 3 of Fig. 2.
Figure 4:
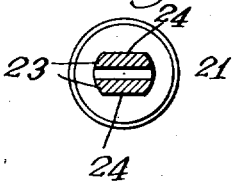
Fig. 4 is a section on line 4 of Fig. 2.

The rivet 20 is provided with a preferably rounded and beveled head 21 and a shank 22. The shank is bifurcated to form the two legs 23, and the outer surface of the legs and shank under the head is provided with flat sides 24 and opposing rounded sides 25 which correspond respectively with the flat sides and rounded opening of a plate with which these rivets are to be used. The outer ends or prongs of the rivets are preferably slightly expanded or separated as shown.

It is to be understood that the head of the rivet may be circular or elliptical, and where the term "flat side" has been used it is not to be understood that each flat side, lies in a single plane, as each side may be slightly curved.

Having now described my invention, what I claim as new and desire to secure by Letters Patent is:

1. A rivet having an enlarged head and a shank, the shank having opposing rounded sides and opposing substantially flat sides extending to the head, the shank being bifurcated part of the distance leaving a solid portion between the head and the crotch of the bifurcation, the length of the said solid portion of the shank being substantially longer than the thickness of a prong.

2. A rivet having an enlarged head and a shank, the shank being bifurcated part of the distance forming the prongs, leaving a solid portion between the head and the crotch of the bifurcation, the length of the said solid portion of the shank being substantially less than the length of the prongs, and the width of said portion being substantially greater than the thickness of the prongs, the opposing sides of the solid portion of the shank and the opposing outer sides of the extended prongs opposite the inner walls of the bifurcation being continuous and unbroken throughout their length, the said opposing sides of the solid portion of the shank being flat and parallel.

In testimony whereof I have hereunto set my hand at New York city, county of New York and State of New York this 17th day of March, 1917.

CLARA S. EATON.

In presence of—
M. V. FENLON,
FRANK T. VOSS.

Copies of this patent may be obtained for five cents each, by addressing the "Commissioner of Patents, Washington, D. C."